United States Patent
Lee et al.

(10) Patent No.: US 9,184,844 B2
(45) Date of Patent: Nov. 10, 2015

(54) OPTICAL NETWORK SYSTEM AND METHOD FOR CONTROLLING OPTICAL NETWORK SYSTEM

(71) Applicant: Electronics and Telecommunications Research Institute, Daejeon (KR)

(72) Inventors: Mun Seob Lee, Daejeon (KR); Dong Soo Lee, Gwangju (KR); Hark Yoo, Gwangju (KR); Sung Chang Kim, Gwangju (KR); Geun Yong Kim, Gyeonggi-do (KR); Young Suk Lee, Gwangju (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 44 days.

(21) Appl. No.: 13/745,112

(22) Filed: Jan. 18, 2013

(65) Prior Publication Data
US 2013/0188953 A1 Jul. 25, 2013

(30) Foreign Application Priority Data
Jan. 20, 2012 (KR) .......................... 10-2012-0006589

(51) Int. Cl.
| H04B 10/00 | (2013.01) |
| H04B 10/27 | (2013.01) |
| H04B 10/272 | (2013.01) |
| H04J 3/22 | (2006.01) |
| H04Q 11/00 | (2006.01) |

(52) U.S. Cl.
CPC ............ *H04B 10/27* (2013.01); *H04B 10/272* (2013.01); *H04J 3/22* (2013.01); *H04Q 11/0067* (2013.01); *H04Q 2011/0088* (2013.01)

(58) Field of Classification Search
CPC ................................ H04J 14/08; H04J 14/086
USPC ..................................................... 398/98–100
See application file for complete search history.

(56) References Cited

U.S. PATENT DOCUMENTS

| 2006/0133809 A1* | 6/2006 | Chow et al. ...................... 398/66 |
| 2010/0080559 A1* | 4/2010 | Sarashina ........................ 398/67 |
| 2011/0002695 A1* | 1/2011 | Choi et al. ...................... 398/155 |

FOREIGN PATENT DOCUMENTS

| JP | 2009-188775 | 8/2009 |
| KR | 10-1064103 | 9/2011 |

OTHER PUBLICATIONS

Cui, Anna et al., "FSAN NG-PON White Paper," pp. 1-52 (2009).
IEEE, "Part 3: Carrier Sense Multiple Access with Collision Detection (CSMA/CD) Access Method and Physical Layer Specifications, Amendment 1: Physical Layer Specifications and Management Parameters for 10 Gb/s Passive Optical Networks" IEEE Standard for Information Technology—Telecommunications and information exchange between systems—Local and metropolitan area networks—Specific requirements, 236 pages (2009).

* cited by examiner

*Primary Examiner* — Daniel Dobson
(74) *Attorney, Agent, or Firm* — Nelson Mullins Riley & Scarborough LLP; Anthony A. Laurentano, Esq.; Lewis Lee, Esq.

(57) ABSTRACT

An optical network system for controlling a passive optical network (PON) in which at least one symmetric optical subscriber terminal and at least one asymmetric optical subscriber terminal coexist is provided.

14 Claims, 6 Drawing Sheets

OPTICAL NETWORK SYSTEM AND METHOD FOR CONTROLLING OPTICAL NETWORK SYSTEM

CROSS-REFERENCE TO RELATED APPLICATION

This application claims the priority benefit of Korean Patent Application No. 10-2012-0006589, filed on Jan. 20, 2012, in the Korean Intellectual Property Office, the disclosure of which is incorporated herein by reference.

BACKGROUND

1. Field of the Invention

The present invention relates to an optical network system that is able to support different transmission speeds for an optical base station apparatus and an optical subscriber terminal in a time division multiple access (TDMA) passive optical network (PON) system.

2. Description of the Related Art

Among Fiber to the Home (FTTH) access methods that are widely applied, a passive optical network (PON) configured with passive elements boasts a widespread usage due to cost effectiveness and convenient maintenance.

In a time division system PON, a PON uses a method of transmitting data of a subscriber end by assigning the data of the subscriber end to a time slot, and may be classified into an Ethernet passive optical network (EPON) and a Gigabit passive optical network (G-PON) based on a protocol structure.

The EPON standard of the Institute of Electrical and Electronics Engineers (IEEE), an international standardization organization, has a transmission speed of 1.25 gigabits per second (Gbps) downstream and 1.25 Gbps upstream. The G-PON standard of the International Telecommunication Union, Telecommunication Standardization Sector (ITU-T) has the transmission speed of 2.5 Gbps downstream and 1.25 Gbps upstream.

Due to a growing demand for a high density Internet Protocol Television (IPTV), a next generation subscriber end service, and the like, research is being conducted to increase the transmission speed of the EPON and the G-PON that generally operate at a transmission speed in the range of Gbps.

One of the primary aspects of a next generation 10 Gbps PON is that an asymmetric configuration in which a downstream transmission speed and an upstream transmission speed differ may be adopted simultaneously with a symmetric configuration.

Transitively, in a system in which the symmetric configuration and the asymmetric configuration are separated, cost effectiveness of a current service may be achieved. Moreover, the asymmetric configuration may have a configuration in which only a downstream receiving data has a transmission speed of 10 Gbps by using an aspect of having more service reception bandwidths than transmission bandwidths.

In this instance, an interface between a physical layer (PHY) block and a media access control (MAC) block with respect to an upstream optical signal has an intricate configuration, and applying the configuration to a system may be difficult.

Since a 10 Gbps XG-PON standard uses an identical wavelength of the asymmetric configuration and the symmetric configuration, when the asymmetric configuration and the symmetric configuration coexist, it may be costly due to a need to change an entire system.

Accordingly, in a case of the asymmetric configuration and the symmetric configuration coexisting with respect to an optical network system, there is a need for a simple system configuration.

SUMMARY

According to an aspect of the present invention, there is provided an optical network system, including at least one symmetric optical subscriber terminal, at least one asymmetric optical subscriber terminal, and an optical base station to control a passive optical network in which the at least one symmetric optical terminal and the at least one asymmetric optical subscriber terminal coexist.

The optical base station may share a single optical line terminal (OLT) as a transceiver of the at least one symmetric optical subscriber terminal and as a transceiver of the at least one asymmetric optical subscriber terminal.

When at least one output signal that is output from a physical medium attachment (PMA) is configured to be asymmetric, the optical base station may use at least one of the at least one output signal.

When the at least one output signals that is output from a PMA is configured to be symmetric, the optical base station may use all of the at least one output signal.

According to another aspect of the present invention, there is provided an optical network apparatus, including a data generating unit to receive an upstream optical signal from each of at least one symmetric optical subscriber terminal or at least one asymmetric optical subscriber terminal, and to generate upstream data by converting the upstream optical signal to an electrical signal, a demultiplexing unit to extract a clock from the upstream data and, thereby demultiplexing by integer multiples, a data processing unit to process data according to each bitrate, and a system clocking unit to provide the clock to the demultiplexing unit and the data processing unit.

In a case of the at least one asymmetric optical subscriber terminal, a difference between an upstream transmission speed and a downstream transmission speed may be in a form of integer multiples.

The demultiplexing unit may extract the clock of the upstream optical signal based on one of the upstream transmission speed and the downstream transmission speed.

The data processing unit may include a data controlling unit to control reproduction of a signal with respect to the upstream optical signal.

According to still another aspect of the present invention, there is provided a method of controlling an optical network, the method including maintaining at least one symmetric optical subscriber terminal, maintaining at least one asymmetric optical subscriber terminal, and controlling a passive optical network in which the at least one symmetric optical subscriber terminal and the at least one asymmetric optical subscriber terminal coexist using an optical base station.

According to yet another aspect of the present invention, there is provided a method of controlling an optical network, the method including receiving an upstream optical signal from each of at least one symmetric optical subscriber terminal or at least one asymmetric optical subscriber terminal, generating upstream data by converting the upstream optical signal to an electrical signal, demultiplexing the extracted clock by integer multiples, by extracting a clock from the upstream data, and processing data according to each bitrate.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

When it is determined detailed description related to a related known function or configuration they may make the purpose of the present invention unnecessarily ambiguous in describing the present invention, the detailed description will be omitted here. Also, terms used herein are defined to appropriately describe the exemplary embodiments of the present invention and thus may be changed depending on a user, the intent of an operator, or a custom. Accordingly, the terms must be defined based on the following overall description of this specification.

An optical network system according to an embodiment of the present invention may share a physical layer (PHY) transceiver of a single optical line terminal (OLT) between an asymmetric terminal and a symmetric terminal when the asymmetric terminal and the symmetric terminal coexist, use at least one of the PHY in a case of an asymmetric configuration among a plurality of n output signals that are output from a physical medium attachment (PMA), and use all of the PHY in a case of a symmetric configuration.

Figure 1:
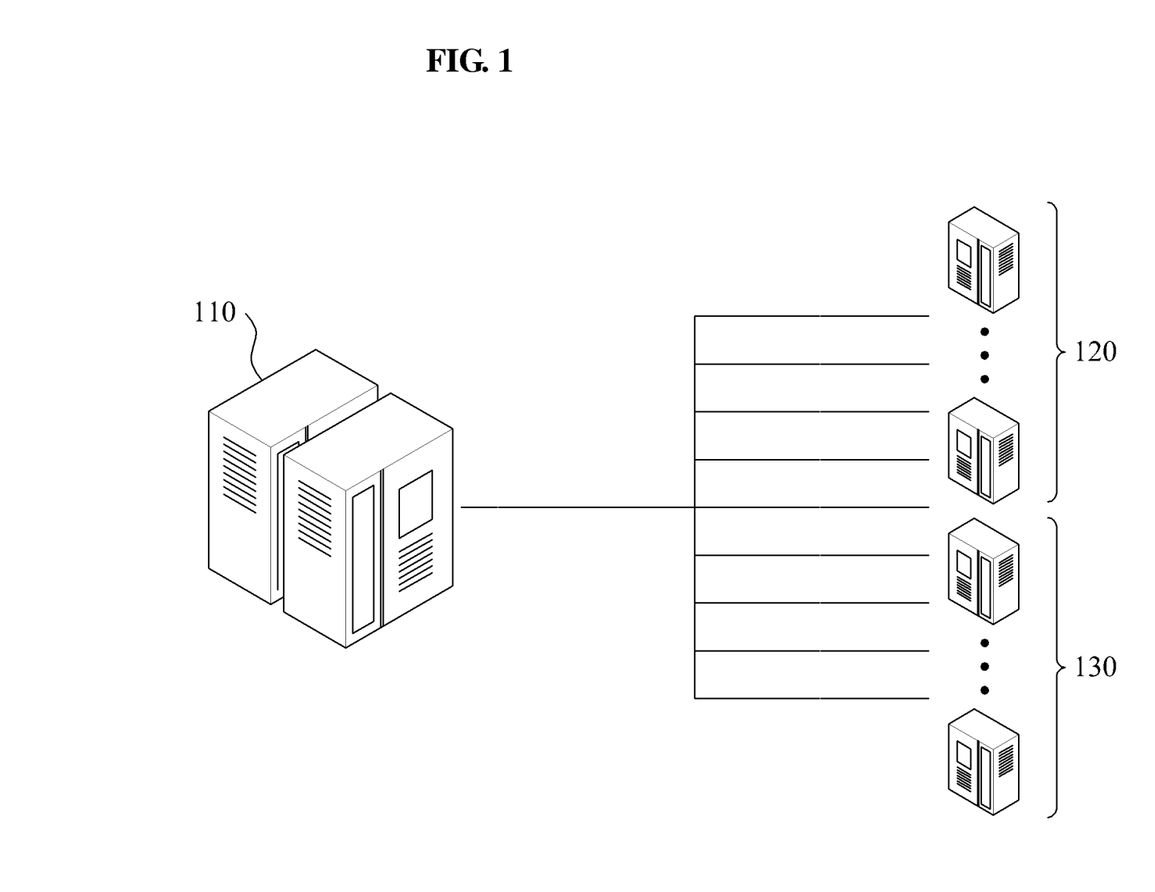
FIG. 1 is a block diagram illustrating a configuration of an optical network system according to an embodiment of the present invention.

FIG. 1 is a block diagram illustrating a configuration of an optical network system according to an embodiment of the present invention.

Referring to FIG. 1, the optical network system may include at least one symmetric optical subscriber terminal 120, at least one asymmetric optical subscriber terminal 130, and an optical base station to control a passive optical network (PON) in which the at least one symmetric subscriber terminal 120 and the at least one asymmetric subscriber terminal 130 coexist.

According to an aspect of the present invention, the optical base station 130 may share a single OLT as a transceiver of the at least symmetric optical subscriber terminal 120 and as a transceiver of the at least asymmetric optical subscriber terminal 130.

According to an aspect of the present invention, when at least one output signal that is output from a PMA is to be assymetric, the optical base station 130 may use at least one of the at least one output signal.

According to an aspect of the present invention, when at least one output signal that is output from a PMA is to be symmetric, the optical base station 130 may use all of the at least one output signal.

Hereinafter, a time division multiple access (TDMA) PON to which an optical network system according to an aspect of the present invention is applicable will be described.

Figure 2:
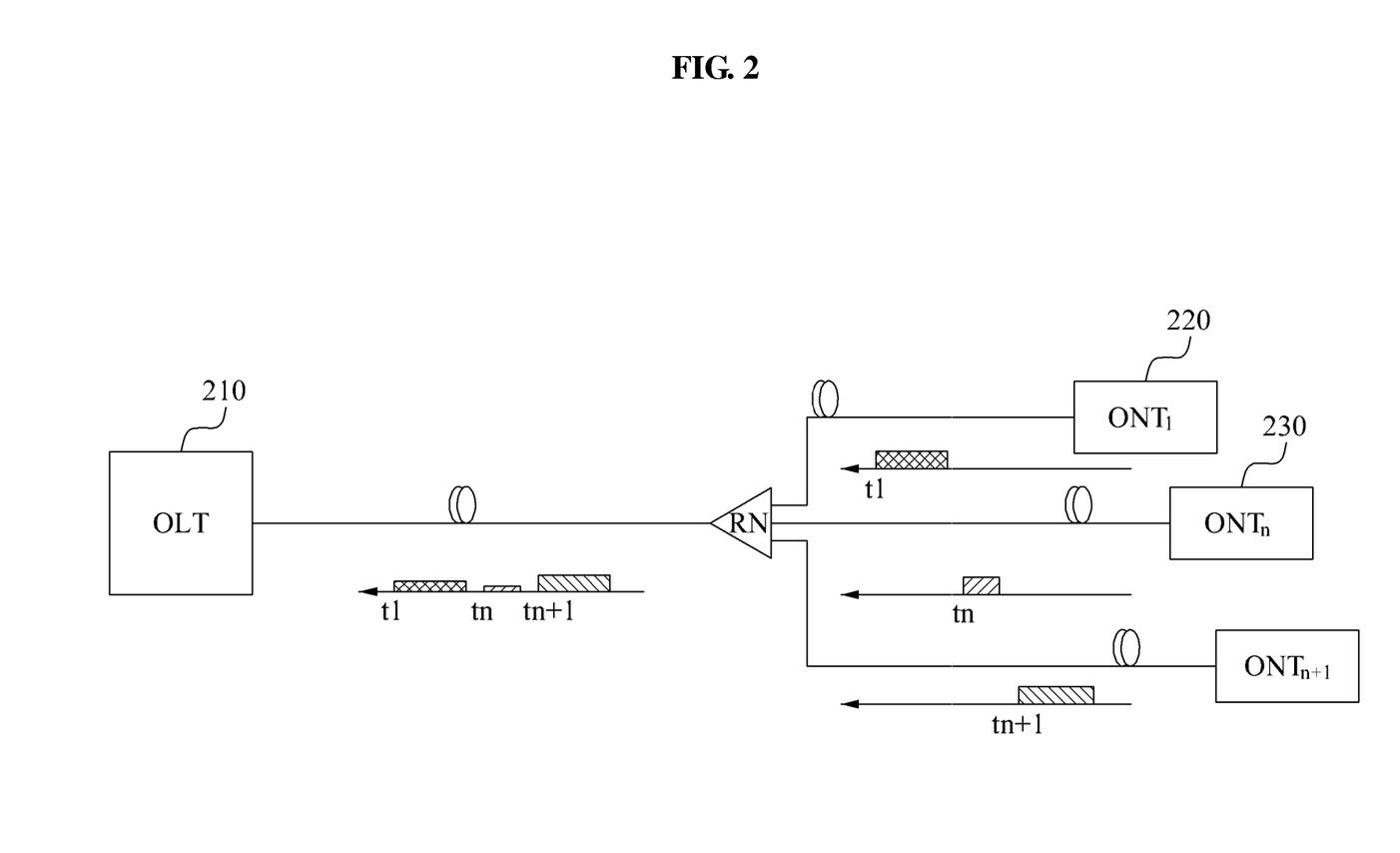
FIG. 2 is a diagram illustrating a structure of a time division multiple access (TDMA) passive optical network (PON) system.

FIG. 2 is a diagram illustrating a structure of a TDMA PON system.

For example, as shown in FIG. 2, the TDMA PON system may include an OLT 210 that is located in a base station and provides a service, a plurality of optical network terminal/units (ONT/ONUs) including an $ONT_1$ 220 and an $ONT_n$ 230, and an optical distribution network (ODN) that connects the OLT 210 to the $ONT_1$ 220 and $ONT_n$ 230, and transmits data.

The ODN may include a remote node (RN) having a passive element such as a splitter, a feeder fiber that is an optical transmission path to the OLT and to the RN, and a distribution fiber, that is, the optical transmission path between the RN and the ONT/U.

The TDMA PON system may be a connecting structure in which the plurality of ONT/ONUs are connected to the OLT via the RN.

In a case of a transmission method of the TDMA PON system, a downstream data optical signal may be transmitted in a continuous mode and branched from the RN, and each of the $ONT_1$ 220 and the $ONT_n$ 230 may receive the downstream data optical signal and process data only assigned to the each of the $ONT_1$ 220 and the $ONT_n$ 230.

An upstream data optical signal of the TDMA PON system may be transmitted to a corresponding time-slot determined by the OLT and combined at the RN.

Hereinafter, an optical network system according to an aspect of the present invention will be described, provided that the $ONT_1$ 220 is an asymmetric optical subscriber terminal to which an XG-PON1 (9.953 G/2.488 G) is applied, and provided that the $ONT_n$ 230 is a symmetric optical subscriber terminal to which an XG-PON2 (9.953 G/9.953 G) is applied.

Figure 3:
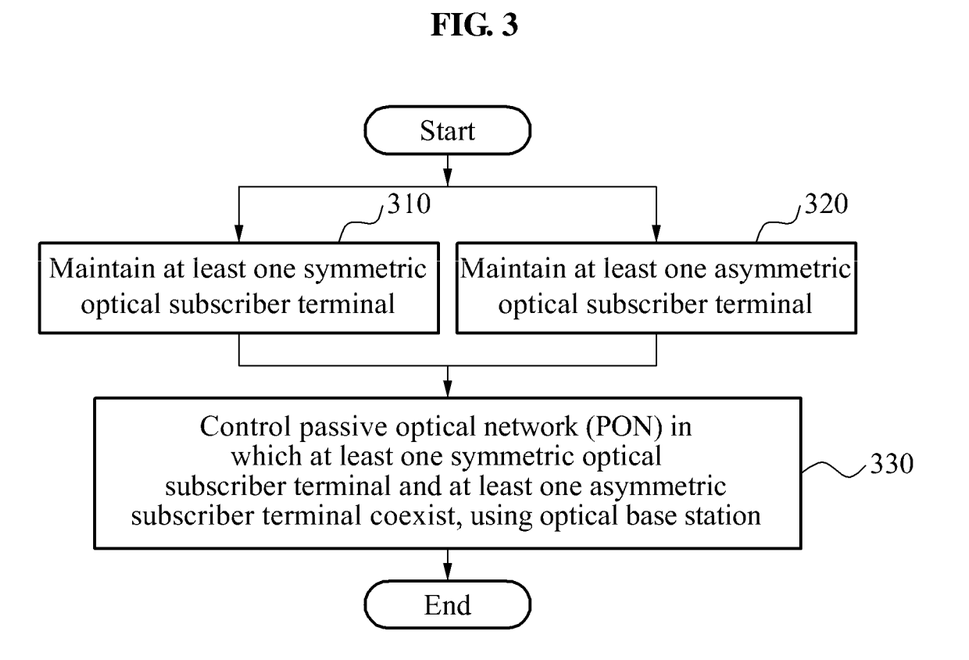
FIG. 3 is a flowchart illustrating a method of controlling an optical network according to an embodiment of the present invention.

FIG. 3 is a flowchart illustrating a method of controlling an optical network according to an embodiment of the present invention.

Referring to FIG. 3, the optical network system may maintain at least one symmetric optical subscriber terminal in operation 310, and maintain at least one asymmetric optical subscriber terminal in operation 320.

In operation 330, the optical network system may control a PON in which the at least one symmetric optical subscriber terminal and the at least one asymmetric subscriber terminal coexist using an optical base station.

Figure 4:
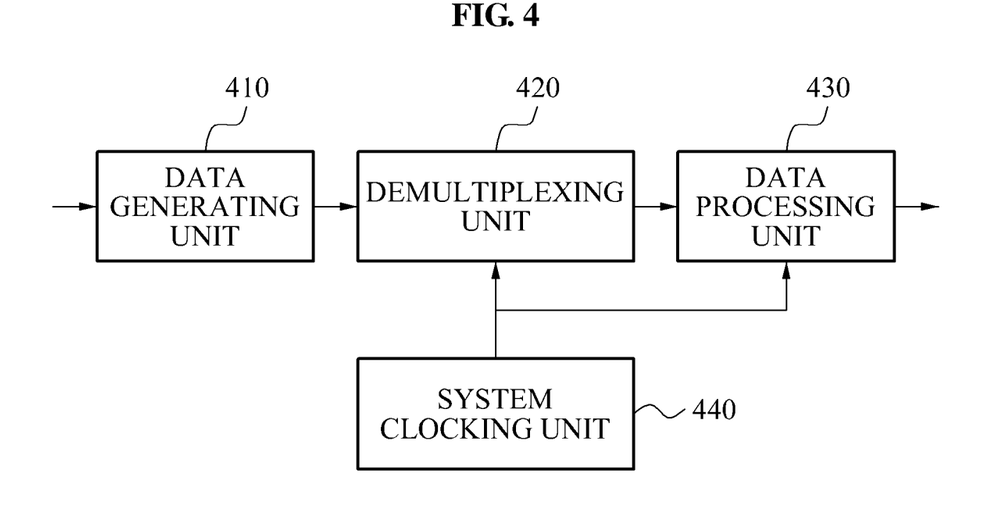
FIG. 4 is a block diagram illustrating an optical network apparatus according to an embodiment of the present invention.

FIG. 4 is a block diagram illustrating an optical network apparatus according to an embodiment of the present invention.

The optical network apparatus may include a data generating unit 410 to receive an upstream optical signal from each of at least one symmetric optical subscriber terminal or at least one asymmetric optical subscriber terminal, and to generate upstream data by converting the upstream optical signal to an electrical signal, a demultiplexing unit 420 to extract a clock from the upstream data and to demultiplex the extracted clock by integer multiples, a data processing unit 430 to process data according to each bitrate, and a system clocking unit 440 to provide the clock to the demultiplexing unit 420 and the data processing unit 430.

The demultiplexing unit 420 according to an embodiment of the present invention may extract the clock of the upstream optical signal based on one of an upstream transmission speed or a downstream transmission speed.

Figure 5:
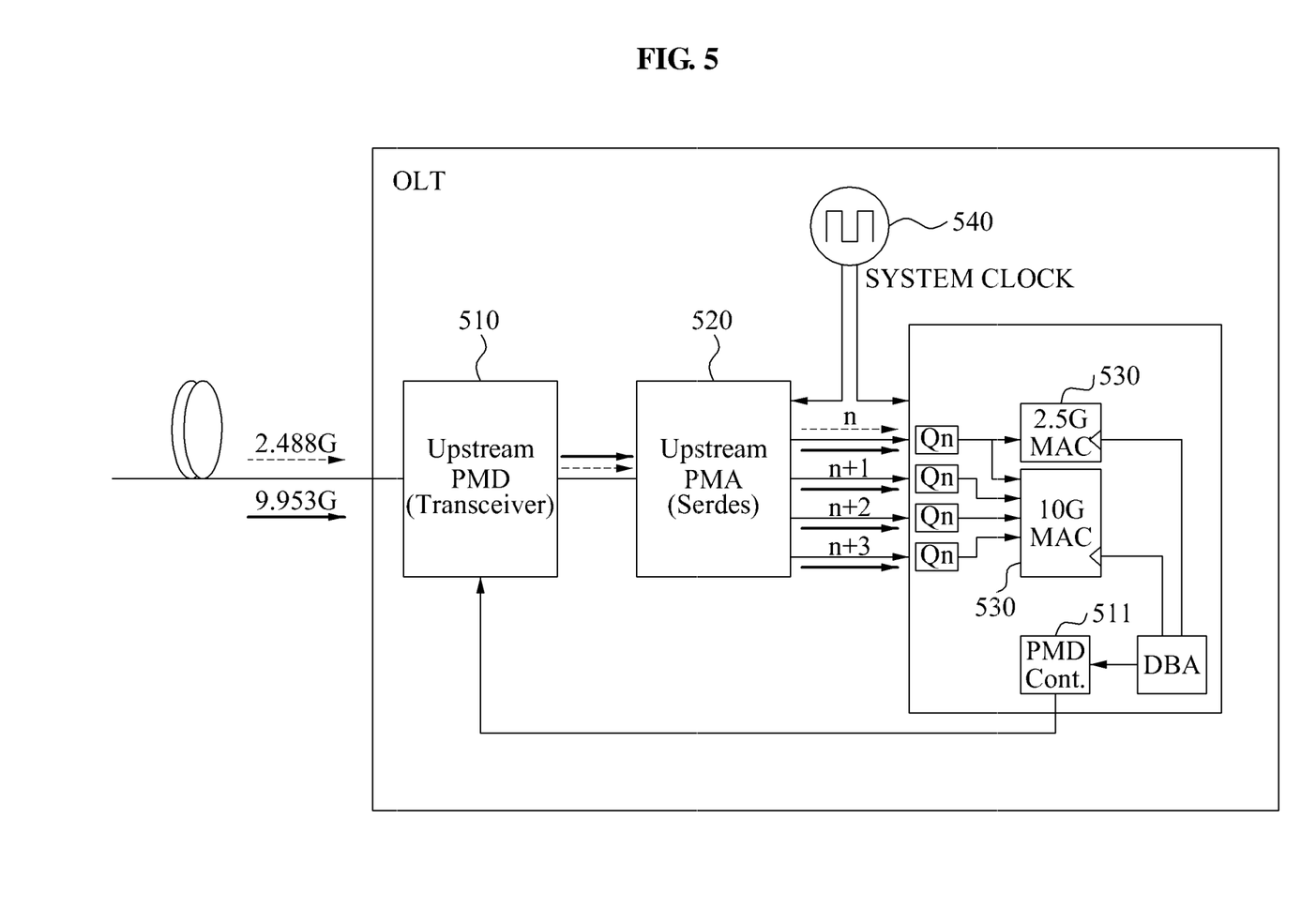
FIG. 5 is a block diagram illustrating a structure of an optical line terminal (OLT) being an optical network apparatus according to an aspect of the present invention.

FIG. 5 is a block diagram illustrating a structure of an OLT being an optical network apparatus according to an aspect of the present invention.

Referring to FIG. 4 and FIG. 5, the data generating unit 410 according to an aspect of the present invention may include an upstream physical medium dependent (PMD) block that converts an upstream optical signal transmitted from an ONT to an electrical signal.

For example, the demultiplexing unit 420 according to an aspect of the present invention may include an upstream physical medium attachment (PMA) block that extracts a clock from upstream data and demultiplexes in a ration of 1:N, such that data processing is possible.

The processing unit 430 according to an aspect of the present invention may include a media access control (MAC) block based on each bitrate.

The system clocking unit 440 according to an aspect of the present invention may provide the clock to the PMA block and the MAC block.

For example, the PMD block may apply an optical module in which the upstream optical signal may receive a 2.488 gigabits per second (Gbps) optical signal or a 9.953 Gbps optical signal.

The data processing unit 430 according to an aspect of the present invention may include a data controlling unit to control a reproduction of a signal with respect to the upstream optical signal.

For example, the reproduction of the signal with respect to the upstream optical signal may be controlled by a PMD controller being the data controlling unit included in the MAC block.

The PMA block may extract the clock from the 2.488 Gbps optical signal or the 9.953 Gbps optical signal, and in lieu of the 2.488 Gbps optical signal the demultiplexing unit may extract a data clock of the 9.953 GHz optical signal.

According to an aspect of the present invention, since data of the 2.488 Gbps optical signal may be divided by 1/n of data of the 9.953 Gbps optical signal, in a case of at least one asymmetric terminal according to an aspect of the present invention, a difference between an upstream transmission speed and a downstream transmission speed is integer multiples.

The optical network apparatus according to an aspect of the present invention may process the 2.488 Gbps optical signal and the 9.953 Gbps optical signal using the identical upstream PMA.

Figure 6:
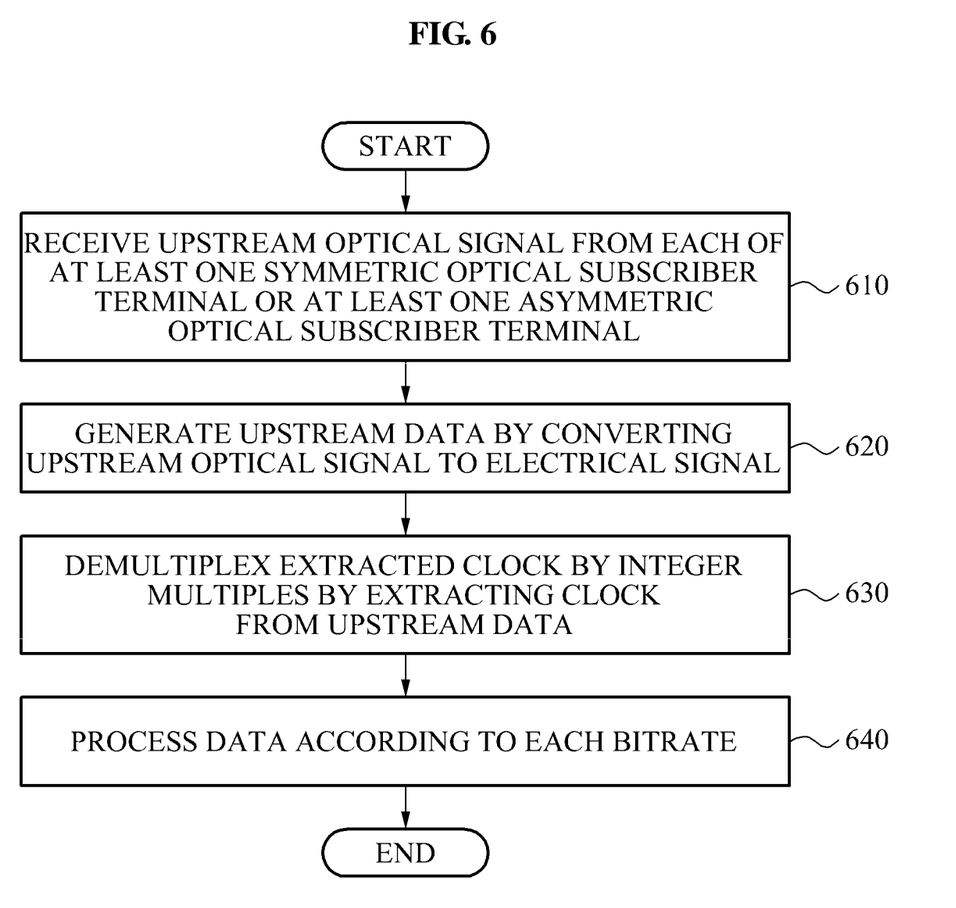
FIG. 6 is a flowchart illustrating a method of controlling an optical network apparatus according to an embodiment of the present invention.

FIG. 6 is a flowchart illustrating a method of controlling an optical network apparatus according to an embodiment of the present invention.

Referring to FIG. 6, in operation 610, the optical network apparatus may receive an upstream optical signal from each of at least one symmetric optical subscriber terminal or at least one asymmetric optical subscriber terminal.

In operation 620, the optical network apparatus may generate upstream data by converting the optical signal to an electrical signal.

In operation 630, the optical network apparatus may perform demultiplexing by integer multiples by extracting a clock from the upstream data.

In operation 640, the optical network apparatus may process data according to each bitrate.

According to an embodiment of the present invention, there is provided an optical subscriber network system and method in which a symmetric terminal and an asymmetric terminal coexist.

According to an embodiment of the present invention, it is possible to provide a wide bandwidth range to a subscriber by gradually applying the symmetric terminal in an optical subscriber network in which the asymmetric terminal is first installed for economical reasons.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An optical network system, comprising:
   at least one symmetric optical subscriber terminal;
   at least one asymmetric optical subscriber terminal; and
   an optical base station to control a passive optical network in which the at least one symmetric optical terminal and the at least one asymmetric optical subscriber terminal coexist,
   wherein an upstream signal from the at least one symmetric optical subscriber terminal and the at least one asymmetric optical subscriber terminal is based on one of a upstream transmission speed and a downstream transmission speed, and an optical clock signal is extracted from the upstream signal,
   wherein the optical base station further comprises a physical medium attachment (PMA) configured to alternatively output an asymmetric output or a symmetric output from one to a plurality of output signals,
   wherein the PMA is configured to output only one output signal when the output signal is configured to be asymmetric, and the PMA is configured to output the plurality of output signals when the output signal is configured to be symmetric.

2. The optical network system of claim 1, wherein the optical base station shares a single optical line terminal (OLT) as a transceiver of the at least one symmetric optical subscriber terminal and as a transceiver of the at least one asymmetric optical subscriber terminal.

3. The optical network system of claim 1, wherein when at least one output signal that is output from a physical medium attachment (PMA) is configured to be asymmetric?, the optical base station uses at least one of the at least one output signal.

4. The optical network system of claim 1, wherein when the at least one output signals that is output from a PMA is configured to be symmetric, the optical base station uses all of the at least one output signal.

5. An optical network apparatus, comprising:
a data generating unit to receive an upstream optical signal from each of at least one symmetric optical subscriber terminal or at least one asymmetric optical subscriber terminal, and to generate upstream data by converting the upstream optical signal to an electrical signal;
a demultiplexing unit to extract a clock from the upstream data and, thereby demultiplexing by integer multiples, wherein the demultiplexing unit extracts the clock of the upstream optical signal based on one of a upstream transmission speed and a downstream transmission speed;
a data processing unit to process data according to each bitrate;
a system clocking unit to provide the clock to the demultiplexing unit and the data processing unit; and
a physical medium attachment (PMA) to alternatively output an asymmetric output or a symmetric output from one to a plurality of output signals,
wherein the PMA is configured to output only one output signal when the output signal is configured to be asymmetric, and the PMA is configured to output the plurality of output signals when the output signal is configured to be symmetric.

6. The optical network apparatus of claim 5, wherein in case of the at least one asymmetric optical subscriber terminal, a difference between the upstream transmission speed and the downstream transmission speed is in a form of integer multiples.

7. The optical network apparatus of claim 5, wherein the data processing unit comprises:
a data controlling unit to control reproduction of a signal with respect to the upstream optical signal.

8. A method of controlling an optical network, the method comprising:
maintaining at least one symmetric optical subscriber terminal;
maintaining at least one asymmetric optical subscriber terminal; and
controlling a passive optical network in which the at least one symmetric optical subscriber terminal and the at least one asymmetric optical subscriber terminal coexist using an optical base station, wherein an upstream signal from the at least one symmetric optical subscriber terminal and the at least one asymmetric optical subscriber terminal is based on one of a upstream transmission speed and a downstream transmission speed, and a optical clock signal is extracted from the upstream signal,
wherein the optical base station further comprises a physical medium attachment (PMA) configured to alternatively output an asymmetric output or a symmetric output from one to a plurality of output signals,
wherein the PMA is configured to output only one output signal when the output signal is configured to be asymmetric, and the PMA is configured to output the plurality of output signals when the output signal is configured to be symmetric.

9. The method of claim 8, wherein the controlling of the passive optical network comprises controlling the optical base station to share an optical line terminal (OLT) as a transceiver of the at least one symmetric optical subscriber terminal and as a transceiver of the at least one asymmetric optical subscriber terminal.

10. The method of claim 8, wherein the controlling of the passive optical network comprises controlling the optical base station to use at least one of the at least one output signal when the at least one output signal that is output from a physical medium attachment (PMA) is configured to be asymmetric.

11. The method of claim 8, wherein the controlling of the optical network comprises controlling the optical base station to use all of the at least one output signal when the at least one output signal that is output from a passive medium attachment (PMA) is configured to be symmetric.

12. A method of controlling an optical network, the method comprising:
receiving an upstream optical signal from each of at least one symmetric optical subscriber terminal or at least one asymmetric optical subscriber terminal;
generating upstream data by converting the upstream optical signal to an electrical signal;
demultiplexing the extracted clock by integer multiples, by extracting a clock from the upstream data, wherein the demultiplexing comprises extracting the clock of the upstream optical signal based on one of a upstream transmission speed and a downstream transmission speed;
processing data according to each bitrate; and
transmitting alternatively an asymmetric output or a symmetric output from one to a plurality of output signals,
wherein only one output signal is transmitted when the output signal is configured to be asymmetric, and the plurality of output signals is transmitted when the output signal is configured to be symmetric.

13. The method of claim 12, wherein in case of the at least one asymmetric optical subscriber terminal, a difference between the upstream transmission speed and the downstream transmission speed is in a form of integer multiples.

14. The method of claim 12, wherein the processing of the data comprises controlling reproduction of a signal with respect to the upstream optical signal.

* * * * *